INVENTOR
FROMUND HOCK

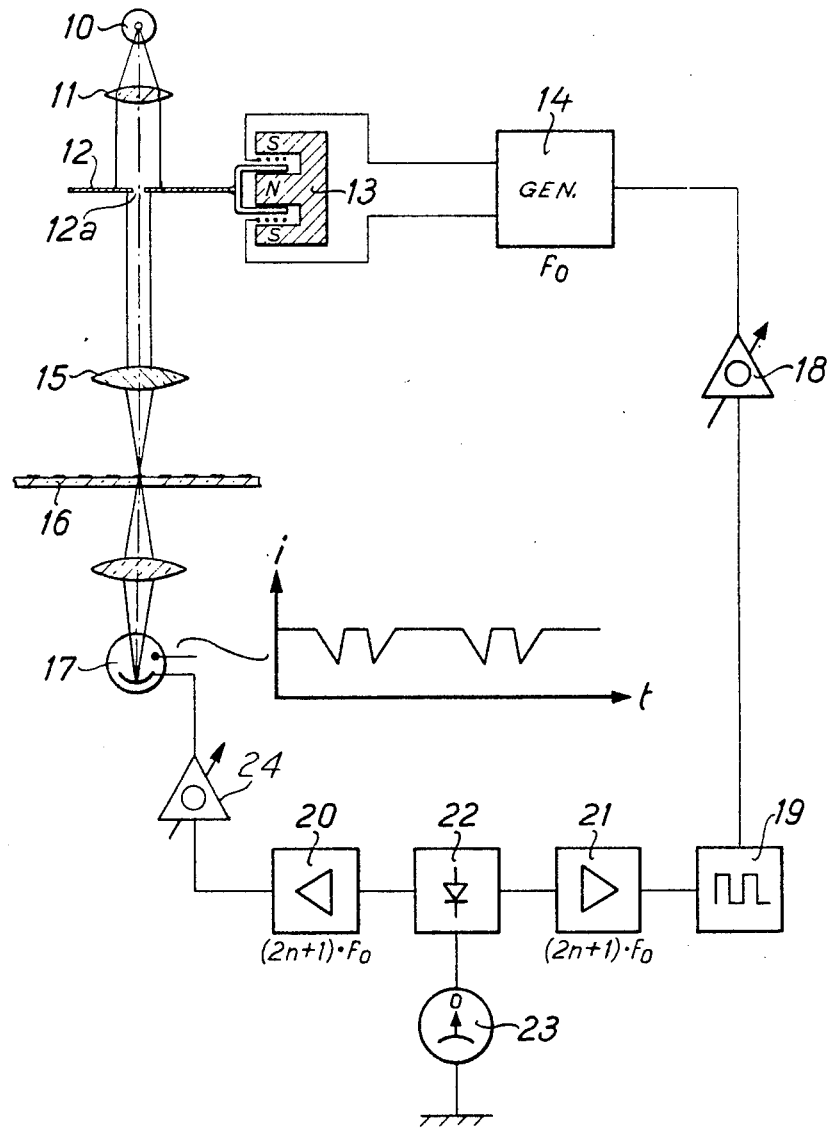

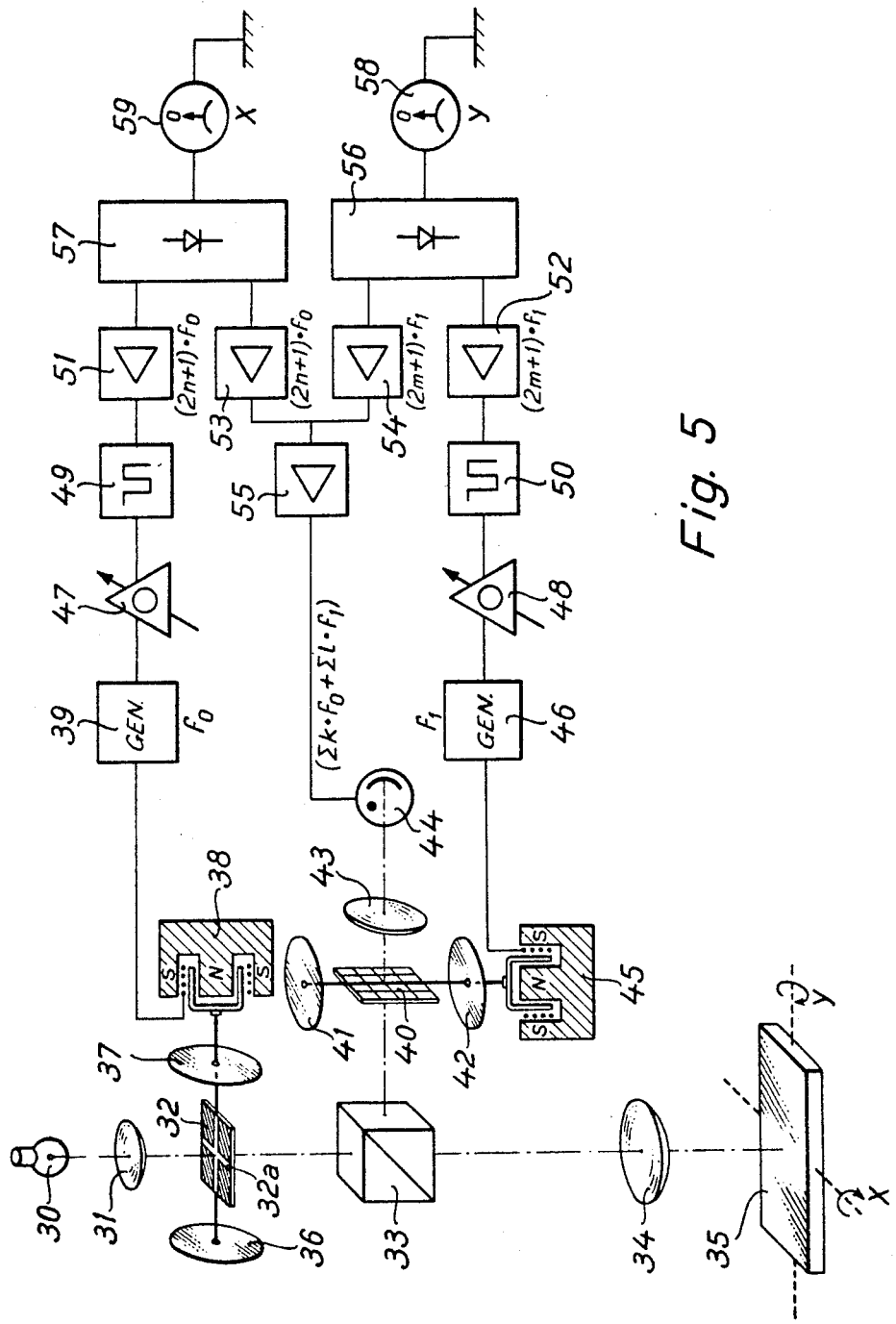

United States Patent Office 3,454,776
Patented July 8, 1969

3,454,776
METHOD AND APPARATUS FOR DETERMINING THE POSITIONS OF INDICIA UTILIZING AN OSCILLATING LIGHT BEAM AND DETECTING AN ODD HARMONIC IN THE OUTPUT
Fromund Hock, Wetzlar, Germany, assignor to Ernst Leitz G.m.b.H., Wetzlar, Germany, a company of Germany
Filed May 19, 1965, Ser. No. 457,052
Claims priority, application Germany, May 20, 1964, L 47,859
Int. Cl. G01d 5/36
U.S. Cl. 250—232                                    21 Claims

ABSTRACT OF THE DISCLOSURE

Accurate measurement of visible markings is accomplished by scanning the markings with a light beam in oscillatory motion, photoelectrically sensing the modifications of the light beam by the markings, and comparing an odd harmonic component of the sensing means output with a corresponding odd harmonic component of the oscillatory motion in a phase-sensitive detector.

---

Figure 1:
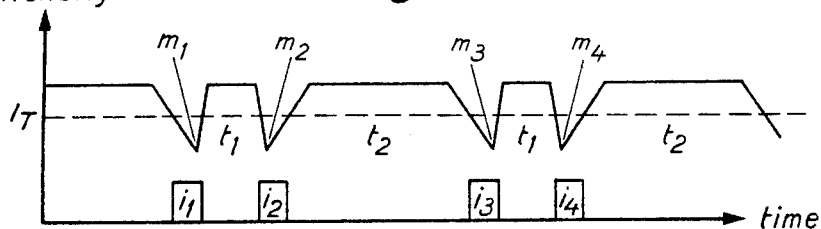

It is well known that, because of manufacturing limitations, it is not possible to provide measuring indicia, or markings, which are completely symmetrical. As a result the extent to which measurement errors or uncertainties can be reduced is limited unless the center of the marking can be located.

Accordingly, it is a principal object of the present invention to provide a technique which makes it possible to ascertain accurately the positions of measuring indicia.

It is another object to provide such a technique which requires a small number of reference elements to accomplish its objective.

It is still another object to provide such a technique which is simple and reliable in its operation.

These and other objects which will appear are achieved by the present invention.

Of interest in connection with the present invention is the so-called "photometric center," which is disclosed, for example, in Swiss Patent No. 327,471. That center determining procedure has the advantage that photoelectric and visual measurement results correspond to each other. The reason is that the aperture and magnification can be made so small that, to both the eye and the photoelectric device the width of the marking image corresponding to the reference image appears to be small compared with the diameter of the image disk pertaining to a given mark. Under these conditions the maximum of the symmetrically diffused marking image coincides with the photometric center of that image.

In the above-mentioned known arrangement the image of the marking is first subdivided geometrico-optically into two components, whose light beams are supplied either simultaneously to two separate photoelectric receptors, or in alternating time sequence to a common photoelectric receptor. The use of two receptors makes the arrangement sensitive to drift and therefore creates the possibility of uncontrollable measurement errors. On the other hand, the optical separation and recombination of the light beams at a common receptor requires a comparatively elaborate optical and switching arrangement. In addition, precautions must be taken to make sure that the photometric transmissivity of both paths is identical. This requires additional adjusting devices.

In accordance with the present invention, measuring indicia or markings are located by a technique, and apparatus for carrying out that technique, which differs from what was previously known in the following respects.

The spatial intensity distribution of the markings to be measured is translated, by oscillatory scanning and the use of a photoelectric detector, into an electrical signal train whose intensity variation with time consists of components corresponding respectively to replicas of said spatial intensity distribution taken in mutually opposite directions paralleling the coordinate along which the scanning takes place. From the frequency spectrum of this signal train, an odd harmonic component is selected. This harmonic is amplified and subsequently rectified, or detected in phase-sensitive manner, together with a corresponding harmonic component derived from the oscillatory scan. The resultant detected signal provides an indication of the position of the measuring marking relative to the center of oscillation.

Further in accordance with the invention, the above described technique can be applied to effect measurements along scanning directions which differ from each other. In that case, scanning systems are used having different oscillatory motions and different oscillatory frequencies and having no odd harmonics in common.

Apparatus in accordance with the present invention comprises an oscillating, luminous slit which is imaged upon the marking whose location is to be determined. A photoelectric receptor is provided for translating into electrical signals light variations resulting from modulation of the light incident upon the marking to be determined. The generator which produces and controls the oscillatory motion serves as electrical reference standard. The outputs of both the photoelectric receptor and the generator are supplied to respective, frequency selective amplifiers which are constructed and arranged to be transmissive of odd harmonics of the oscillatory frequency. A phase-shifter is preferably connected between the generator and that amplifier to which the generator output is supplied. The outputs of both amplifiers are mixed in a phase-sensitive rectifier, or detector, whose output drives a null-indicating meter, i.e. a meter whose indicator deflects in opposite directions from its zero, or null indication in response to applied signals of opposite polarities.

To determine the location of a marking along two different directions, the apparatus in accordance with the invention is provided with an oscillating, luminous aperture, formed of two slits which intersect at the same angle as the two said directions, and which oscillates in the direction of one of the slits. In addition, there is provided a second marking-bearing body provided with markings or lines intersecting at the same said angle. This body is positioned in a plane which is the conjugate of the plane of oscillation of the luminous aperture. Moreover, this body oscillates in the direction of the other said slit. The two oscillatory movements are produced by two different generators whose frequencies have no odd harmonic components in common. In addition, four frequency selective amplifiers are provided, whose outputs are connected in pairs to respective phase-sensitive rectifiers or detectors, and thence to null-indicating meters.

This technique, and the apparatus for carrying it out, which are described above, have the great advantage that the photometric center of measuring indicia can be determined in a simple manner.

Figure 2:
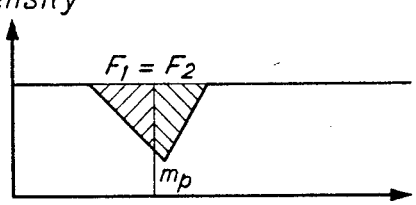
Figure 3:
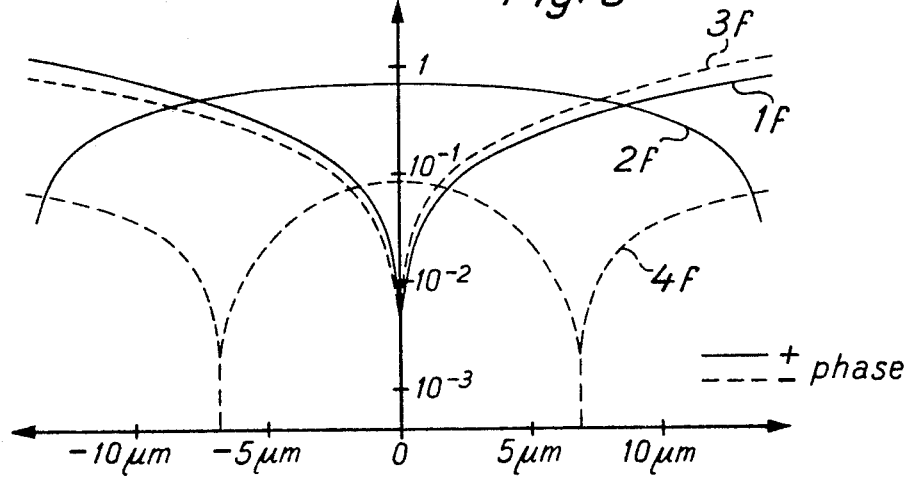

For further details, reference may be had to the discussion which follows, in the light of the accompanying drawings wherein FIGURE 1 is a graphic illustration of certain shortcomings of the prior art, FIGURE 2 is a graphic illustration of certain aspects of the technique embodying the present invention, FIGURE 3 is a further illustration of certain aspects of the present invention, FIGURE 4 is a diagram, principally in block form, of an embodiment of the invention, and FIGURE 5 is a similar diagram of another embodiment of the invention.

Referring first to FIGURE 3, the present invention utilizes the fact that, in the decomposition into their Fourier components of the signals obtained by oscillatory scanning, whose intensity variation with time is composed of replicas of the spatial intensity distribution in mutually opposite directions along the scanning coordinate, the odd harmonic components go to zero when the center of oscillation of the scanning slit coincides with the photometric center of the marking.

The above is diagrammatically illustrated in FIGURE 3, in which there are plotted along the ordinate the amplitudes of the first four harmonics (designated 1f through 4f, respectively), versus displacement (plotted along the abscissa) of the scanning slit in opposite directions from the photometric center (designates as "O"). As will be seen from FIGURE 3, the first and third harmonics both go to zero at the photometric center.

Referring now to FIG. 1, it is known that if an aperture and a marking are displaced to and fro relative to each other, the photoelectric receptor produces a signal such as illustrated, for example, by the jagged solid line in the upper portion of FIG. 1. It is apparent that the center of oscillation does not coincide with the location of the marking since $t_1$ differs from $t_2$. In prior art utilization techniques, the pulses produced by scanning were transformed into square waves, using a threshold, or trigger potential $I_T$. This yields pulses $i_1$, $i_2$, $i_3$, etc., as shown in FIG. 1. As is further apparent, the centers of these pulses are subject to displacements, dependent upon the magnitude of the trigger potential, along lines $m_1$, $m_2$, $m_3$, etc., respectively. As a result, an unambiguous indication of the position of the marking would be possible only with concomitant knowledge of the particular trigger level being used. Since it is known, however, that the indicia of a measuring scale are subject to a variety of variations, some of them considerable, both in their forms and in their photometric properties, even the use of a known trigger level leaves the relative distances of markings from each other not fully determined.

This problem can be overcome by relying on the photometric center of the marking to determine the location of its center (see FIG. 2). As has been shown, a series of sensing pulses such as represented in FIG. 1, upon decomposition into its Fourier components, produces harmonics whose amplitudes depend on the relative position of the center of oscillation and the marking. This is shown in FIG. 3 for harmonics up to the fourth. As can be seen, the zero-crossings of the odd harmonics coincide. At zero-crossing a 180° phase reversal takes place. More detailed analysis then shows that the points of zero-crossing mark the photometric centers of measuring indicia regardless of shape, provided only that the scanning motion is symmetrical.

The technique embodying this invention exploits this result. It should be kept in mind that in this technique, too, performance is limited by the noise of the light source, receptor, amplifier, etc. However, in this technique it is possible to provide exceptionally good noise suppression by utilizing that particular odd harmonic for the measurement which has the most favorable signal-to-noise ratio. The signal can also be raised above the noise by establishing the proper relationship between the width of the indicating mark and the oscillating slit width.

The instant technique can also be used to advantage for scanning along several coordinates. In that case, the information concerning the measuring indicia positions along the various coordinates can be segregated by appropriate selection of the mutually different scanning frequencies, even though all of them pass through the same photoelectric transducer.

FIG. 4, to which reference may now be had, shows apparatus in accordance with the invention for determining the location of a marking in one coordinate. This arrangement comprises a diaphragm 12, provided with a slit 12a which is illuminated by lamp 10 via a condensing lens 11. The oscillatory motions of the diaphragm are produced by a magnetic system 13 comprising a concentric magnet and a coil movable within the annular gap separating the poles of the magnet. This coil is supplied with an alternating signal of frequency $f_0$ from a generator 14.

The illuminated slit 12a is imaged via objective 15 upon indicia bearing object 16 and thence upon a photoelectric receptor 17, which senses and transforms into electrical signals the light signals modulated by the indicia of object 16.

A phase-shifter 18, as well as a square wave generator 19 are also connected to the output of generator 14. The square wave generator has the purpose of enhancing the high-frequency content of the generator output signal. The outputs of the photoelectric receptor and the square wave generator are respectively applied to frequency sensitive amplifiers 20 and 21, both of which are made transmissive (e.g. by tuning) of signal components at a frequency $(2n+1) f_0$, where $n$ is any desired integer. A phase-sensitive rectifier or detector 22 mixes the output signals of the two amplifiers and drives a null-indicating meter, or similar instrument 23 which, for precise photometric null-position, produces no deflection. Another phase shifter 24, similar to phase shifter 18, may also be connected in the signal path from photoelectric receptor 17 to amplifier 20.

FIG. 5, to which reference may now be had, shows a corresponding arrangement for determining the position of a marking in relation to two coordinates $x$ and $y$ oriented at an angle to each other. A lamp 30 illuminates, via condensing lens 31, a diaphragm 32 which is provided with an aperture 32a formed of two slits which intersect at the angle formed by the above-mentioned coordinates. This illuminated aperture is imaged, via optical beam splitter 33, and objective 34, upon a reflector 35 which is subject to oscillation along the two desired coordinates $x$ and $y$.

Diaphragm 32 is supported by two fixedly attached membranes 36 and 37 and is caused to oscillate in the direction of the slit corresponding to the $y$ coordinate direction by means of a magnet system 38 comprising a concentric magnet and a coil movable within the concentric slot separating the magnet poles in response to an alternating signal of frequency $f_0$ supplied by generator 39.

The reflected light beam is directed via objective 34 and beam splitter 33 to indicia bearing object 40. This object bears a plurality of markings intersecting at the same angle as the diaphragm slits. This object is supported by two fixedly attached membranes 41 and 42 and is set into motion, by means of a magnet system 45 similar to system 38, in such manner as to move in a direction corresponding to that of the other slit of diaphragm 32. From this indicia bearing object the light travels via optical means 43 to a photoelectric receptor 44. Magnet system 45 is excited with an alternating signal of frequency $f_1$ supplied by generator 46.

The output signals of generators 39 and 46 are supplied respectively to phase-shifters 47 and 48 and thence to square wave generators 49 and 50. The outputs of these square wave generators are in turn supplied respectively to frequency selective amplifiers 51 and 52. These are respectively transmissive (e.g. by tuning) of frequencies $(2n+1) f_0$ and $(2m+1) f_1$, $n$ and $m$ being any desired positive integers. Corresponding frequency selective amplifiers 53 and 54 are connected to the output of the amplifier 55 which amplifies the output signals from photoelectric receptor 44. These last-named signals may be represented by the expression $\Sigma k \cdot f_0 + \Sigma l \cdot f_1$, $k$ and $l$ being positive integers. Amplifiers 51 and 53 and amplifiers 52 and 54 are respectively connected to the inputs of phase-sensitive rectifiers or detectors 57 and 56. The outputs of the detectors are in turn connected to null indicating meter instruments 59 and 58, respectively.

I claim:

1. The method of determining the positions of measuring indicia comprising the steps of: transforming the spatial intensity distribution of the indicia into an electrical signal train by oscillatory scanning of the indicia by a photoelectric transducer, the signal train having an intensity variation with time comprising replicas of the spatial intensity distribution in mutually opposite directions along the scanning coordinate; selecting an odd harmonic component above the fundamental from the frequency spectrum of the signal train; amplifying the said harmonic component; subjecting the said harmonic component to phase-sensitive detection together with a corresponding harmonic component derived from the oscillatory sensing motion; and utilizing the detected signal to indicate the position of the indicia center relative to the center of the oscillatory scanning.

2. The method of claim 1 further characterized in that the odd harmonic selected is that whose signal-to-noise ratio is highest for the prevailing bandwidth.

3. The method of claim 1 further characterized in that for determining the positions of the indicia along plural coordinates, a corresponding plurality of oscillatory scannings along the respective coordinates is performed, the said scannings being performed at frequencies having no odd harmonic component in common.

4. The method of claim 3 further characterized in that from each of the scannings there is selected an odd harmonic component whose signal-to-noise ratio is highest for the prevailing bandwidth.

5. A system for determining the locations of measuring markings comprising: at least one oscillating luminous slit imaged upon the marking to be located; a photoelectric receptor for transforming into electrical signals the variations due to modulation in the light impinging upon said marking; a generator for producing the signal causing the oscillation of said slit and also serving as electrical reference signal, frequency selective amplifiers respectively supplied with the output from the photoelectric receptor and the generator, the said amplifiers being transmissive of an odd harmonic component above the fundamental of the oscillation frequency; a phase-sensitive detector for mixing the outputs of both said amplifiers; a phase-shifter connected between the generator and the phase-sensitive detector supplied with the generator output; and a null-indicating measuring instrument supplied with the output from the detector.

6. The system of claim 5 further comprising a square wave generator connected between the reference generator and the detector.

7. A system for determining two coordinates of the locations of measuring markings comprising: at least two luminous slits including an angle differing from 180° imaged upon the marking to be located; first generator means for causing said slits to oscillate in the direction of one of its slits at a given frequency; an auxiliary body bearing at least two markings intersecting at the same angle as at least two luminous slits and in a plane which is the conjugate of the plane of oscillation of said slits; second generator means for causing said body to oscillate in the direction of the other of said at least two luminous slits and at an other frequency having no odd harmonic in common with said given frequency; a photoelectric receptor for transforming into electric signals variations in the light reaching said receptor from said at least two luminous slits via said markings to be located; two pairs of frequency selective amplifiers, those of one said pair being transmissive of an odd harmonic above the fundamental of said given frequency and being supplied respectively with the output signal from said receptor and a signal derived from said first generator means, and those of the other said pair being transmissive of an odd harmonic above the fundamental of said other frequency and being supplied respectively with the output signal from said reception and a signal derived from said second generator means; two phase-sensitive detecting means, respectively supplied with the output signals from one and the other of said pairs of amplifiers; and two null-indicating measuring instruments respectively supplied with the output signals from said detectors.

8. The system of claim 7 further comprising a phase shifter and a square wave generator connected between each said reference generator and the respective phase sensitive detector.

9. A system for determining the location of a marking, said system comprising: means for producing oscillatory scanning of said marking at a predetermined frequency; photoelectric means for sensing said oscillatory scanning and producing an electrical signal in response thereto; means for deriving from both said scanning means and from said photoelectric means electrical signals at a frequency equal to an odd harmonic above the fundamental of said predetermined frequency; and means for sensing the amplitude of and the phase difference between said derived signals.

10. The system of claim 9 further characterized in that said scanning means comprises an oscillator productive of a signal at said predetermined frequency, an aperture for illuminating said marking, and means responsive to said oscillator signal to cause said aperture to oscillate.

11. The system of claim 10 further comprising square wave generating means supplied with the signal from said oscillator.

12. The system of claim 11 further comprising phase shifting means connected intermediate said oscillator and said phase sensitive detector.

13. The system of claim 9 characterized in that said odd harmonic signal deriving means comprises frequency selective amplifiers transmissive of said odd harmonic frequency.

14. The system of claim 9 further characterized by having a predetermined bandwidth and in that the derived odd harmonic signals are those having the highest signal-to-noise ratio for said bandwidth.

15. The system of claim 9 further comprising null-indicating meter means for displaying an indication of said phase and amplitude detection.

16. A system for determining the location of a marking along different coordinates, said system comprising: means for producing oscillatory scanning of said marking in plural directions corresponding to said different coordinates and at different frequencies; photoelectric means for sensing said oscillatory scannings and producing electrical signals in response thereto; means for deriving from the scanning in each of said directions and from said photoelectric means signals at frequencies equal to odd harmonics above the fundamental of said different frequencies, respectively; and means for sensing the amplitude of and the phase difference between each pair of said derived signals at the same frequency.

17. The system of claim 16 characterized in that said different oscillatory scanning frequencies have no odd harmonics in common.

18. The system of claim 17 characterized in that said scanning means comprises an aperture for illuminating said marking and a body carrying an auxiliary marking, and means for causing said aperture to oscillate in one direction and said auxiliary body in another direction.

19. The system of claim 5 comprising a phase shifter connected between the photoelectric transducer and the phase sensitive detector.

20. The system of claim 7 comprising at least one phase shifter connected between the photoelectric transducer and the respective phase sensitive detector.

21. The system of claim 9 comprising a phase shifter connected between the photoelectric means and the means for sensing the amplitude and phase.

References Cited

UNITED STATES PATENTS

| | | | |
|---|---|---|---|
| 3,012,148 | 12/1961 | Snyder et al. | 250—203 |
| 3,017,552 | 1/1962 | Brouwer | 250—202 X |
| 3,100,846 | 8/1963 | Burkhardt | 250—219 |
| 3,209,152 | 9/1965 | Brouwer | 250—202 |
| 3,297,879 | 1/1967 | Meyer | 250—219 |
| 3,317,739 | 5/1967 | Larraburu et al. | 250—232 |
| 3,335,281 | 8/1967 | Willits | 250—202 |
| 3,360,655 | 12/1967 | McKeown | 250—235 X |

OTHER REFERENCES

German Gebrauchmuster 1,792,220, Askaniawerke A.G., 10.4.59.

RALPH G. NILSON, *Primary Examiner.*

M. LEAVITT, *Assistant Examiner.*

U.S. Cl. X.R.

250—202, 203, 219, 235, 237; 356—172